United States Patent [19]

Matsuda et al.

[11] 4,267,546

[45] May 12, 1981

[54] ALARM DEVICE FOR INFORMING REDUCTION OF PNEUMATIC PRESSURE OF VEHICLE TIRES

[75] Inventors: Akira Matsuda, Higashimurayama; Norio Goshima, Musashino; Shigeo Yasuda, Musashino; Motoaki Iwasaki, Musashino; Hiroshi Nishino, Musashino, all of Japan

[73] Assignees: Bridgestone Tire Company Limited, Tokyo; Mitaka Instrument Company Limited, Musashino, both of Japan

[21] Appl. No.: 49,829

[22] Filed: Jun. 18, 1979

[30] Foreign Application Priority Data

Jun. 20, 1978 [JP] Japan .................................. 53/75034

[51] Int. Cl.³ ...................... B60C 23/04; G08B 21/00
[52] U.S. Cl. ..................................... 340/58; 73/146.5
[58] Field of Search ............ 340/58; 200/61.22, 61.25; 73/146.5

[56] References Cited

U.S. PATENT DOCUMENTS

| | | | |
|---|---|---|---|
| 3,383,654 | 5/1968 | Hendricks | 340/58 |
| 3,613,075 | 10/1971 | Griffiths et al. | 340/58 |
| 3,840,850 | 10/1974 | Whiteing et al. | 340/58 |
| 4,064,482 | 12/1977 | Maisch et al. | 340/58 |
| 4,086,564 | 4/1978 | Claxton | 340/58 |
| 4,110,732 | 8/1978 | Jarocha et al. | 340/58 |

Primary Examiner—John W. Caldwell, Sr.
Assistant Examiner—Joseph E. Nowicki
Attorney, Agent, or Firm—Sughrue, Rothwell, Mion, Zinn and Macpeak

[57] ABSTRACT

An alarm device for signalling a reduction of pneumatic pressure of vehicle tires comprises an oscillator 6 having coil secured to a chassis of a vehicle, and a resonator 1 secured to the peripheral portion of a wheel having a tire adjacent to the coil and consisting of a pressure switch 4 for sensing an abnormal change of tire pressure, and a resonant coil and a capacitor 5 tuned to an electromagnetic wave radiated from the oscillation coil. A signal processing device contains means for sensing a change in an oscillation condition generated in the oscillator due to a resonant condition of the resonator switched on and off in accordance with abnormal internal tire pressure and for processing a signal from the sensing means, and an alarm for generating a warning signal in accordance with the output of the signal processing device. The latter comprises an input section 21 having a desired number of terminals, a signal processing section 22 having an arithmetic circuit connected to the input section, a resettable latch circuit 26, 31, and an alarm section 23 operated by the output of the latch circuit whereby an alarm signal is not generated when the speed of the vehicle becomes lower than the prescribed threshold value at normal internal pressure.

3 Claims, 5 Drawing Figures

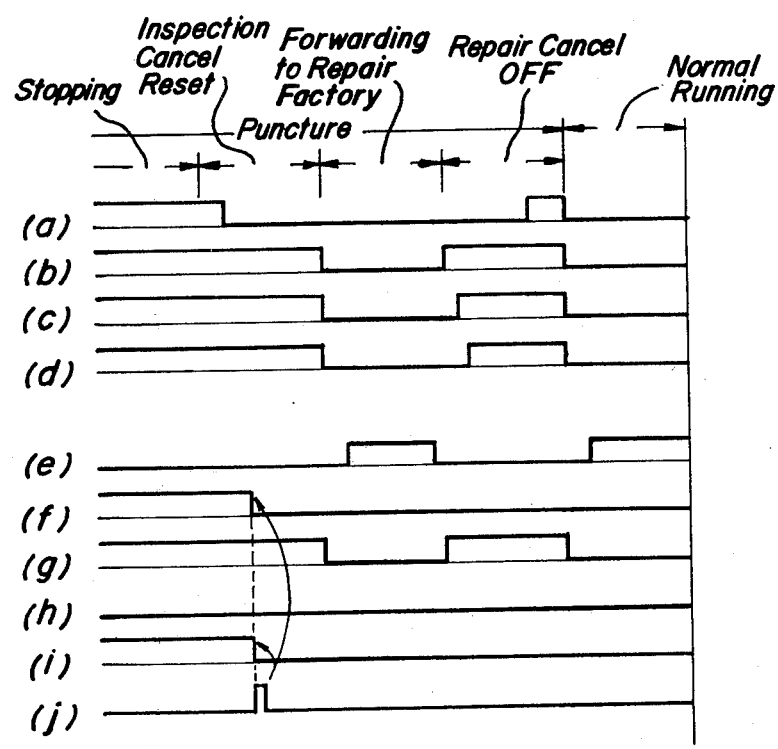

ALARM DEVICE FOR INFORMING REDUCTION OF PNEUMATIC PRESSURE OF VEHICLE TIRES

BACKGROUND OF THE INVENTION

The present invention relates to an alarm device for signalling a reduction of the pneumatic pressure of vehicle tires with the aid of a resonance phenomenon of electro-magnetic coupling.

As alarm devices for sensing abnormal change of an internal pneumatic pressure of vehicle tires when running and for informing it to a driver, mention may be made of a signal transmission system and a resonance phenomenon of electromagnetic coupling.

An alarm device with the aid of a signal transmission system, in case of adopting it as, for example, unattended operation of a new traffic system or an automatic train stop device, requires a transmitter and a receiver for every one of a plurality of rolling stocks or vehicles for constructing one train, so that its construction becomes complicated and expensive, while it is necessary to prevent interference between transmitters and receivers of each vehicle.

An alarm device with the aid of a resonance phenomenon of electromagnetic coupling, as apparent from Japanese Patent Application Ser. No. 150,235/76 and Japanese Patent Application Ser. No. 150,236/76, solves a problem of the signal transmission system, but a light emitting diode or a lamp is energized or lighted when stopping even if an internal pneumatic pressure is normal and then an alarm is undesirably generated. Conversely speaking, it means automatic inspection whether the circuit of the alarm device is normally operated.

However, even if the pneumatic pressure of a tire is normal as described above and if an alarm is generated when stopping, when a means for appealing the sense of hearing such as a buzzer or the like is employed as an alarm device, the alarm buzzer is annoyingly rung at every stopping and such buzzer cannot be used for unattended operation of a new traffic system or automatic train stop device or the like.

SUMMARY OF THE INVENTION

An object of the present invention is to eliminate the above described disadvantages of the conventional alarm device.

Another object of the present invention is to provide an alarm device for informing reduction of pneumatic pressure of vehicle tires, which is so properly constructed and arranged that an alarm signal by means of a buzzer is not generated when a pneumatic pressure of a tire is normal and a train is stopped.

The present invention is formed on the basis of the recognition that in case of a vehicle having four wheels, such condition is set that an alarm signal is not generated at low speed running and stopping of the vehicle by using a signal obtained by a speed meter.

According to the present invention an alarm device for informing reduction of pneumatic pressure of vehicle tires comprises an oscillator having an oscillation coil secured to a chassis side of a vehicle; a resonator secured to the peripheral portion of a wheel having a tire adjacent to the oscillation coil and consisting of a pressure sensing switch operated by sensing abnormal change of pneumatic pressure of vehicle tire, a resonance coil and a capacitor which are resonated with an electromagnetic wave radiated from the oscillation coil; a signal processing device containing a sensing means for sensing change in an oscillation condition generated in the oscillator due to a resonant condition of the resonator switched on and off in accordance with abnormal internal pressure of the tire and for processing a signal sensed by the sensing means, and an alarm means for generating a warning signal in accordance with the output of the signal processing device.

The signal processing device comprises a signal input section having a desired number of input terminals, a signal processing section having an arithmetic circuit connected to the signal input section, a latch circuit and a reset circuit thereof, and an alarm section operated by the output of the latch circuit whereby an alarm signal is not generated when the speed of the vehicle becomes lower than the prescribed threshold value at normal internal pressure.

The signal processing section comprises a plurality of first parallel arranged AND gates each having an input terminal connected to the output of the signal input section and the number of which is equal to that of the output terminals of the signal input section, an OR gate having input terminals of the number of equal to that of the output terminals of the signal input section, a second AND gate having an input terminal connected to the output terminal of the OR gate, a wave shaping circuit including at its input side a switch having an output terminal connected to the other input terminal of the second AND gate and the other input terminal of each first AND gate, respectively, and ON and OFF controlled at a prescribed threshold speed of a speed meter, a first latch circuit provided at the output side of the first AND gates and having latch elements of the number equal to that of the first AND gates, a second latch circuit connected to the output of the second AND gate and consisting of a single latch element, and an alarm reset circuit having an input terminal connected to an alarm signal reset switch and an output terminal connected to the second input terminals of the first and the second latch circuits.

The alarm section comprises a photocoupler and a relay connected to the second latch circuit thereby to generate and display an alarm at a remote place. The signal processing section further comprises a switch for cancelling the input of the pressure reduction sensed signal provided between the signal input terminal of the signal input section and the first AND gates and the OR gate of the signal processing section whereby the reduction of normal wheels can again be performed by releasing switch contact flowing the pressure reduction sensed signal therethrough.

BRIEF DESCRIPTION OF THE DRAWINGS

FIG. 5 is a waveform for explaining the operation of the alarm device according to the present invention capable of alarming the reduction of pneumatic pressure in case of forwarding the troubled train or vehicle to a repair factory when abnormal pressure of the vehicle is sensed and the function of the troubled vehicle is only stopped.

DESCRIPTION OF THE PREFERRED EMBODIMENT

Figure 1:
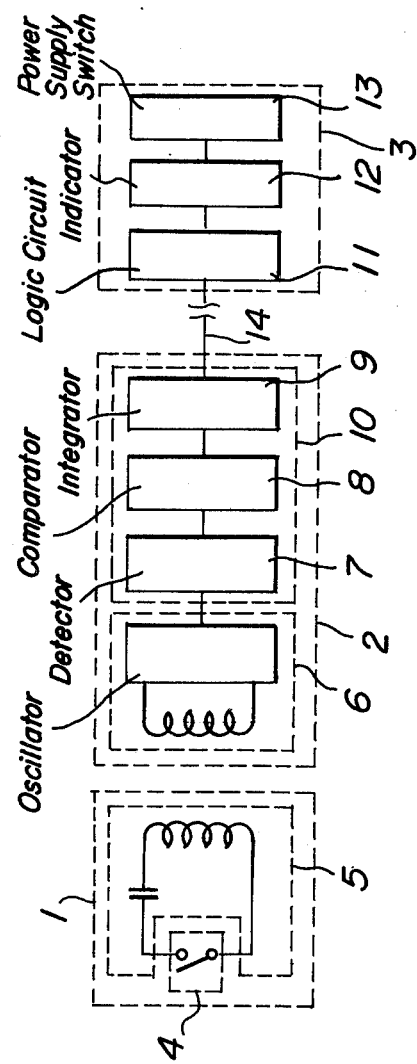
FIG. 1 is a block diagram showing the construction of a conventional alarm device for informing reduction of pneumatic pressure of vehicle tires with the aid of a resonance phenomenon of electromagnetic coupling.

FIG. 1 shows a conventional alarm device for informing reduction of pneumatic pressure of vehicle tires. This alarm device comprises a resonance section 1, an oscillation section 2 and an alarm section 3. The resonance section 1 includes an internal pneumatic pressure sensing switch 4 and a resonator 5 consisting of a series combination of a resonance coil and a capacitor. The oscillation section 2 includes an oscillator 6 consisting of a series or parallel circuit of an oscillation coil and a capacitor and an oscillation circuit, and a signal processing device 10 consisting of a detector 7 for detecting the output of the oscillator 6, a comparator 8 for comparing the output thereof and an integrator 9 for integrating the output thereof. The alarm section 3 comprises a logic circuit 11 for logically operating the output of the integrator 9, an indicator or alarm device 12 and an electric power supply switch 13. In this case, the output of the integrator in the oscillation section 2 is connected to the logic circuit 11 of the alarm section 3 through a cable 14.

According to such circuit arrangement, an alarm signal is generated when not only the internal pneumatic pressure of a tire is reduced but also a vehicle is stopped even if the tire pressure is normal, and particularly in case of using a buzzer as an alarm device, the buzzer is annoyingly rung every stopping.

The invention is properly constructed and arranged so as not to generate an alarm signal nor ring an alarm device (buzzer) when the internal pneumatic pressure is normal even if a vehicle is stopped.

Figure 2:
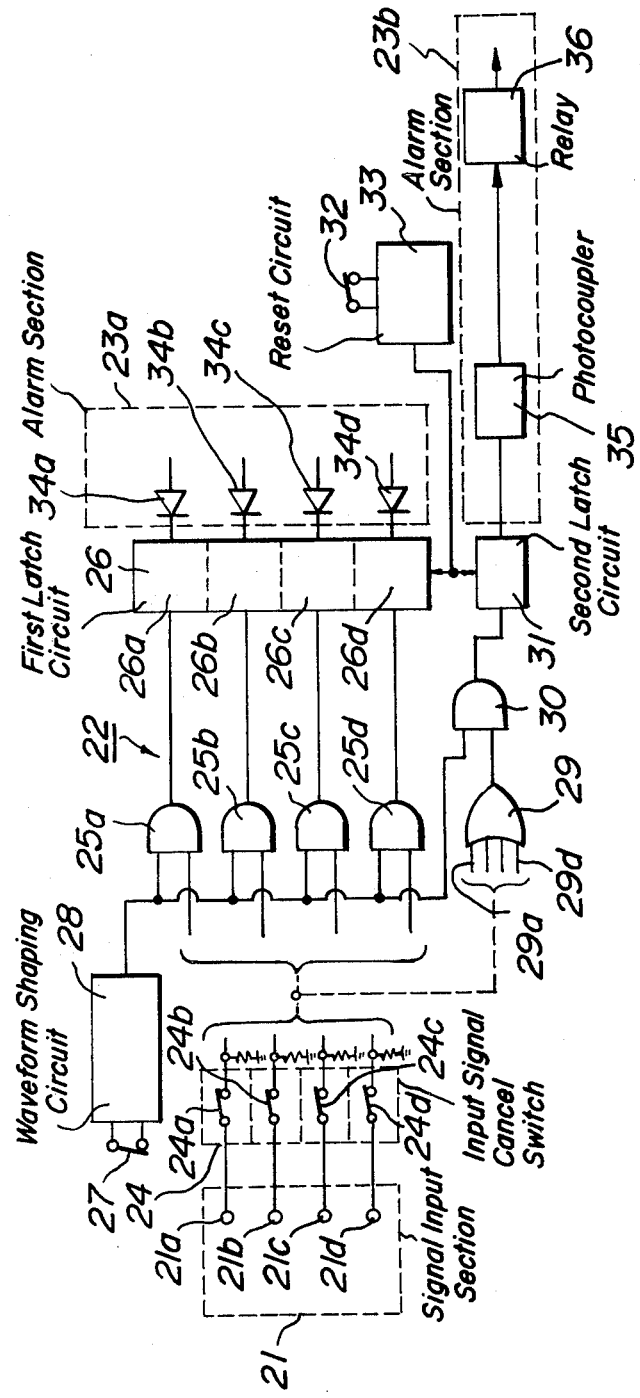
FIG. 2 is a diagram showing one embodiment of an alarm device for informing reduction of pneumatic pressure of vehicle tires having a signal processing device according to the present invention.

The signal processing device according to the invention, as shown in FIG. 2, comprises a signal input section 21, a signal processing section 22 and an alarm section 23. To four input terminals 21a, 21b, 21c and 21d of the signal input section 21 are supplied the outputs of alarm devices, i.e., the outputs of the integrator 9 shown in FIG. 1, provided in each tire (the number of tires is four based on the above precondition in this embodiment).

The signal processing section 22 comprises a reduced pressure sensed signal input cancel switch 24 provided at the output side of the signal input section 21, four first AND gates 25a–25d one of each input terminal being connected to the output side of the switch 24, a first latch circuit 26 having four latch elements 26a–26d provided at the output sides of these AND gates 25a–25d, a waveform shaping circuit 28 having an inverter (not shown) and an ON-OFF switch 27 connected to the other input sides of the AND gates 25a–25d in common and switched on and off by a prescribed threshold speed of a speed meter, an OR gate 29 having four input terminals 29a–29d connected to the signal input section 21, a second AND gate 30 connected to the output side of the OR gate 29 at its one input terminal and connected to the waveform shaping circuit 28 at its other input terminal, a second latch circuit 31 consisting of a single element connected to the output side of the AND gate 30 at its one input terminal and connected to the output side of a reset circuit 33 at its other input terminal, and a reset circuit 33 which output side is connected to the first and second latch circuits 26 and 31 and input side is connected to an alarm signal reset switch 32.

The alarm section 23a comprises four light emitting diodes 34a–34d connected to latch elements 26a–26d, respectively, and these light emitting diodes are provided in the chassis of a train or the driver's cab of a vehicle.

The alarm section 23b further comprises a photocoupler 35 provided at the output side of the second latch circuit 31 and a relay 36 provided at the output side of the photocoupler 35, and this relay 36 actuates an alarm device provided in the driver's cab of a train or the central control room by unattended operation.

According to the present invention, a signal taken out of the speed meter is supplied to the other input terminals of the AND gates 25a–25d. That is, the speed meter provided in the vehicle is properly constructed, and when running by its electrical output or mechanical output, i.e., more than the prescribed threshold speed, say more than 5–10 km/H, the switch 27 is made the OFF state and a low level signal is supplied to the waveform shaping circuit 28. When the vehicle speed becomes less than the prescribed threshold speed, i.e., less than 5–10 km/H, the switch 27 is made ON state by an output signal of the speed meter and a high level signal is supplied to the waveform shaping circuit 28. For this purpose, the waveform shaping circuit 28 is provided with an inverter or the like so as to deliver at its output side a signal which is inverted from a signal supplied to its input side.

Figure 3:
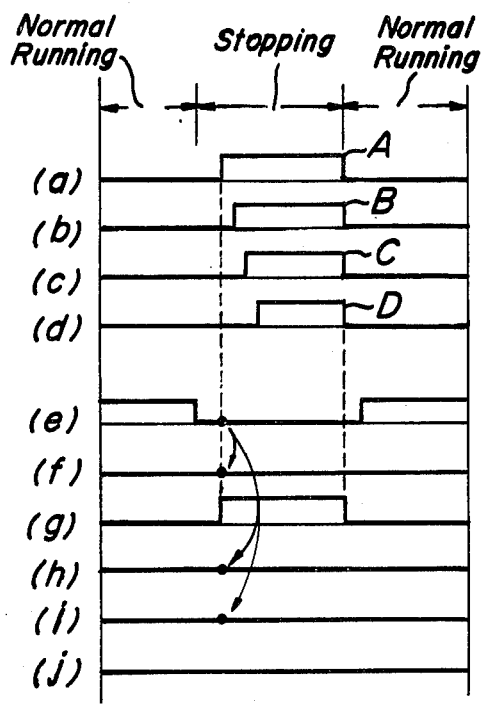
FIG. 3 is a waveform for explaining the action of the alarm device according to the present invention when normally running and stopping.

In the first place, when a tire pneumatic pressure is normal and the vehicle is stopped, the operation of the signal processing device according to the present invention is explained with reference to FIG. 3.

The signal processing device according to the invention will be explained with reference to the case of applying to a train with the use of tire wheels such as a monorail, subway or the like composed of a plurality of vehicles, but the present invention is not limited thereto but can be applied to any vehicles having two, three or more than three wheels, such as motorcycles, passenger cars, trucks, buses, aircrafts and the like. In case of the aircraft, however, wheels are controlled by high pneumatic pressure apart from low pneumatic pressure control, but when a prescribed pressure value of the tire pneumatic pressure sensing switch 4 as shown in FIG. 1 is properly adjusted, the present invention is naturally applicable to any wheels controlled by the low pneumatic pressure or the high pneumatic pressure. Now, in case of stopping the vehicle, if its speed is less than a prescribed threshold value, for example, 5 km/H, the switch 27 is under the ON state, and as a result, a low level signal generated at the output side of the waveform shaping circuit 28 shown in the stop section of FIG. 3e is supplied to one input terminal of the AND gates 25a–25d and one input terminal of the AND gate 30, respectively. Therefore, even if to input terminals 21a–21d of the signal input section 21 are successively supplied high level signals A, B, C and D detected at the stopping time shown in FIGS. 3a, 3b, 3c and 3d, the output sides of these AND gates 25a–25d remain at a low level, and as a result, the latch elements 26a–26d also remain at a low level, so that the light emitting diodes 34a–34d are not energized. On the other hand, the above high level signals A, B, C and D are supplied to the input terminals 29a–29d of the OR gate 29, and at their output sides are produced a high level signal shown in the stop section of FIG. 3g and this signal is supplied to the other input terminal of the AND gate 30, but one input terminal of the AND gate 30 is already supplied with a low level signal shown in the stop section of FIG. 3e, so that the output side of the AND gate 30 is still under the low level signal shown in the stop section of FIG. 3h, and as a result, the second latch circuit 31 is not actuated and the photocoupler 35 and the relay 36 are not actuated, too. Thus, any alarm, particularly a buzzer never sounds in the driver's cab or the central control room.

Figure 4:
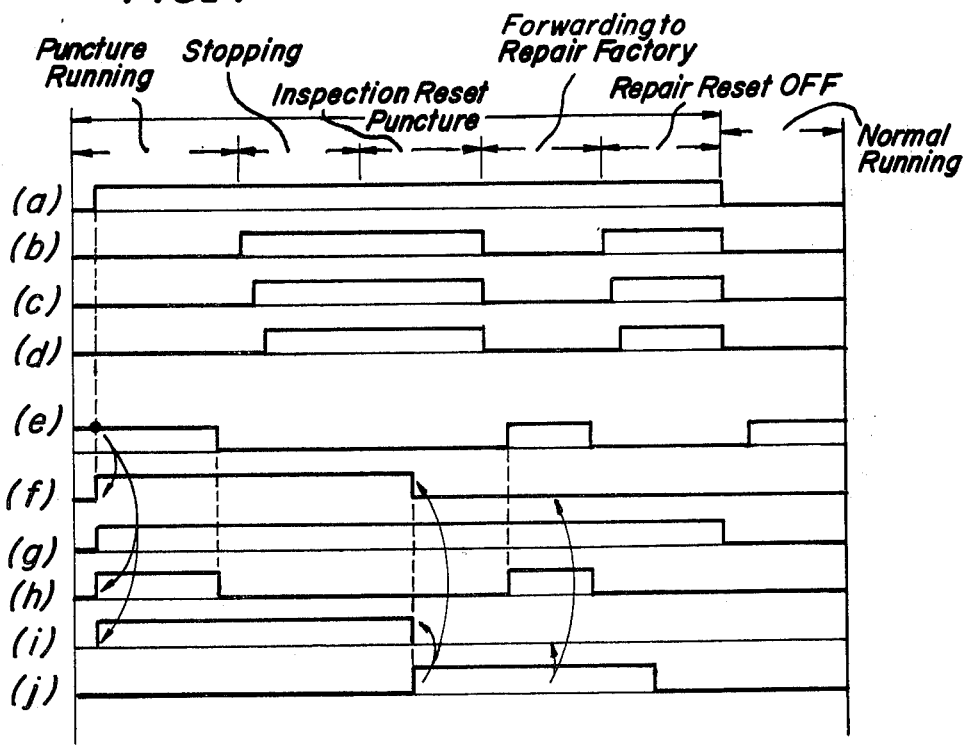
FIG. 4 is a waveform for explaining the operation of the alarm device according to the present invention in case of forwarding the troubled train or vehicle to a repair factory when abnoraml pressure of the vehicle is sensed and full functions of the vehicle is stopped.

In FIG. 4 is explained the case that at least one of four wheels is punctured or reduced to less than the prescribed threshold pneumatic pressure value. In this embodiment, since the vehicle is running, a speed meter shows at least a threshold speed, i.e., 5 km/H, and the switch 27 is under the OFF state, so that a high level signal is supplied to the waveform shaping circuit 28 and a high level signal showing the initial and the puncture running section of FIG. 4e appears on the output side of the shaping circuit 28, and this signal is supplied to one input side of the AND gates 25a–25d and 30. Supposing that a high level signal A generated by sensing abnormal pneumatic pressure of a tire and shown in the puncture running section-repair section of FIG. 4a arrives at the input terminal 21a of the signal input section 21 through the cable 14 (FIG. 1), this signal A is supplied to the other input terminal of the AND gate 25a and the input terminal 29a of the OR gate 29. Signals supplied from the other normal pneumatic pressure vehicles to the input terminals 21b–21d are low level signals shown in the puncture running sections of FIGS. 4b, 4c and 4d. Therefore, the output signal of the AND gate 25a becomes high level, so that the latch element 26a of the first latch circuit 26 is actuated, and as a result, to the light emitting diode 34a is flowed a high level signal shown in the puncture running section of FIG. 4f so as to energize the diode 34a. The high level signal A arrived at the input terminal 21a is also supplied to the input terminal 29a of the OR gate 29, so that even if low level signals (the puncture running sections of FIGS. 4b, 4c and 4d) showing the normal pneumatic pressure are supplied to the other input terminals 29b–29d, the OR gate 29 generates a high level signal shown in the puncture running section of FIG. 4g and this signal is supplied to the other input terminal of the AND gate 30. Since the AND gate 30 has already supplied a high level signal designating the running shown in the puncture running section of FIG. 4e to its one input terminal, a high level signal shown in the puncture running section of FIG. 4h is generated at its output side, and this signal actuates the second latch circuit 31, to generate a high level signal shown in the puncture running section of FIG. 4i at the output side thereof, thereby energizing the light emitting diode of the photocoupler 35 and operating the relay 36 resulting in an actuation of an alarm device, for example a light emitting element or a buzzer, in the driver's cab or the central control room. In response to this alarm, a driver or a supervisor in the central control room can stop a vehicle or a train. Therefore, at the input terminals 21b, 21c and 21d of the signal input section 21 arrive high level signals B, C and D, respectively, produced by sensing the stopping inspection shown in the stop sections of FIGS. 4b, 4c and 4d, and to the other input terminals of the AND gates 25b, 25c and 25d are supplied high level signals B, C and D, while these high level signals B, C and D are also supplied to the input terminals 29b, 29c and 29d of the OR gate 29. At the time of stopping a vehicle or a train, however, the switch 27 is under the ON state by the output signal of the speed meter to less than the threshold speed, so that on the output side of the waveform shaping circuit 28 appears a low level signal shown in the stop section of FIG. 4e and this low level signal is supplied to each one of the input terminals of the AND gates 25a–25d and 30. Therefore, the output signals of the AND gates 25a–25d become low level and the light emitting diodes 34b, 34c and 34d are not energized, but as is apparent from the waveform shown in the stop section of FIG. 4f, the light emitting diode 34a is energized by the action of the latch element 26a. The AND gate 30, at the time of supplying a low level signal from the above-mentioned waveform shaping circuit 28 to its one input terminal, becomes a low level shown in the stop section of FIG. 4h, but the output signal of the photocoupler 35 remains a high level by the action of the second latch circuit 31 as shown in the stop section of FIG. 4i. At the time of stopping a vehicle or a train, the driver or supervisor inspects the vehicle of an abnormal pneumatic pressure, confirms the troubled vehicle, presses the alarm signal reset switch 32, actuates the alarm reset circuit 33, releases the action of the first and second latch circuits 26 and 31 by the output signal shown in the inspection section of FIG. 4j, supplies a low level signal shown in the inspection section of FIGS. 4f and 4i to the light emitting diode 34a and the light emitting diode of the photocoupler 35, releases alarms of the alarm sections 23a and 23b, forwards the train or vehicle to a repair factory, removes the cause of the abnormal pneumatic pressure, repairs the abnormal portion, releases the alarm signal reset switch 32 to release the alarm reset circuit 33, makes the output signal a low level as shown in the repair section of FIG. 4j, and runs the train or vehicle again under the normal condition.

The present invention also can sense the abnormal pneumatic pressure state of the other normal vehicles in case of forwarding the troubled train or vehicle to the repair factory. This case will be explained with reference to FIG. 5.

This embodiment is same as that explained with respect to FIG. 4 from the sensing of the abnormal pneumatic pressure to the stopping of the train or vehicle, so that the operation during this period is omitted. In this embodiment, if the abnormal pneumatic pressure sensed signal A shown in the stop section of FIG. 5a has already arrived at the input terminal 21a of the signal input section 21, after confirmation of the wheel having the abnormal pneumatic pressure detected by inspection and before forwarding to the repair factory, the alarm signal reset switch 32 is thrown to generate a one-shot signal shown in the inspection section of FIG. 5j from the alarm reset circuit 33, the output signals of the first latch circuit 26 and the second latch circuit 31 are made low level by this signal as shown in the inspection sections of FIGS. 5f and 5i so as to release the latch action and to be ready to operate the next action, while the switch contact 24a of the reduced pressure sensed signal input cancel switch 24 is released, a high level signal arrived at the other input terminal of the AND gate 25a and the first input terminal 29a of the OR gate 29 is forcedly converted into a low level signal shown in the inspection section of FIG. 5a, and thereafter, it is supposed that the low level signal shown in the forwarding section of FIG. 5a always arrives at the input terminal of the corresponding gate during forwarding.

When an abnormal pneumatic pressure is generated in any one of the other three wheels during forwarding and a high level signal generated by sensing a reduced pressure as shown in the puncture running section of FIG. 4a arrives at corresponding terminals of the input terminals 21b, 21c and 21d of the signal input section 21, a train or a vehicle is again stopped in the same manner as explained in FIG. 4. Thus, after the vehicle having the abnormal pneumatic pressure is inspected, the corresponding contact of the reduced pressure sensed signal input cancel switch 24 shown in FIG. 2 is released, and a forwarding to the repair factory capable of detecting an abnormal pneumatic pressure is continued to the remaining normal vehicles. After repaired the troubled vehicle forwarded to the repair factory, all of the contacts 24a-24d of the reduced pressure sensed signal input cancel switch 24 are thrown as shown in the repair section of FIG. 5a and a train or a vehicle is again normally operated.

In the signal processing device with such arrangement according to the present invention, in case of applying it to a train having a plurality of vehicles coupled with each other, light emitting elements 34a-34d of the alarm section 23a are mounted to each vehicle and the photocoupler 35, the relay 36 and the alarm device such as a light emitting element or a buzzer of the alarm section 23b, are preferably arranged in the driver's cab of a train or the central control room of unattended operation in desired numbers corresponding to the number of vehicles. In this case the second latch circuit is also preferably provided in desired numbers corresponding to the number of vehicles.

When the signal processing circuit according to the present invention is applied to a single vehicle, such as passenger car, truck, bus, aircraft or the like, the alarm section 23b is omitted but the light emitting elements 34a-34d of the alarm section 23a are only provided in the driver's cab and these light emitting elements 34a-34d can be used together with buzzers.

As apparent from the above, the present invention can provide an alarm device for informing reduction of pneumatic pressure of vehicle tires, which never generates an alarm to a driver's cab when a pneumatic pressure is normal and a vehicle is stopped, makes the other normal vehicles again alarmable when sensing any abnormal pneumatic pressure and forwarding the troubled train or vehicle, and is particularly preferable to arrange in a train composed by coupling a plurality of vehicles or in a central control room in such train of unattended operation.

The invention is not limited to the above embodiments but can be modified variously. For example, the above embodiment is explained with the case of four wheels, but it is possible to decrease or increase the number of wheels, such as 3, 6 or more than that. In this case, the number of input terminals of the signal input section, the number of the AND gate, the number of latch elements of the latch circuit can correspond to the number of wheels, such as 3, 6 or more than that. Further, any arithmetic circuit can be used other than that described in the foregoing, and various type of the switches which are ON.OFF-controlled by the waveform shaping circuit and the speed meter can naturally be used.

What is claimed is:

1. In an alarm device for signalling a reduction of pneumatic pressure of vehicle tires including an oscillator (6) having an oscillation coil secured to a chassis of a vehicle; a resonator (1) secured to a peripheral portion of a wheel having a tire adjacent to the oscillation coil and including a pressure sensing switch (4) responsive to an abnormal change of the pneumatic pressure of said vehicle tire, a resonant coil (5) which and a capacitor (5) which are tuned to an electromagnetic wave radiated from the oscillation coil; a signal processing device (3) containing means for sensing a change in an oscillation condition generated in the oscillator due to a resonant condition in the resonator switched on and off in accordance with abnormal internal pressure of the tire and for processing a signal sensed by the sensing means; and an alarm means for generating a warning signal in accordance with the output of the signal processing device; the improvements characterized by: the signal processing device including a signal input section (21) having a desired number of input terminals, a signal processing section (22) having an arithmetic circuit connected to the signal input section and comprising a plurality of first parallel arranged AND gates (25) each having an input terminal connected to an output of the signal input section and equal in number to the output terminals of the signal input section, an OR gate (29) having a plurality of input terminals equal in number to the output terminals of the signal input section, a second AND gate (30) having an input terminal connected to an output terminal of the OR gate, a wave shaping circuit (28) including at an input side a switch (27) and having an output terminal connected to another input terminal of the second AND gate and to another input terminal of each first AND gate, respectively, said wave shaping circuit having an ON and OFF output controlled at a prescribed threshold speed of a speed meter, a first latch circuit (26) provided at an output side of the first AND gates and having a plurality of latch elements equal in number to the first AND gates, a second latch circuit (31) connected to an output of the second AND gate and consisting of a single latch element, and an alarm reset circuit (33) having an input terminal connected to an alarm signal reset switch (32) and an output terminal connected to a second input terminal of each of the first and the second latch circuits, and an alarm section operated by outputs of the first and second latch circuits, whereby an alarm signal is not generated when the speed of the vehicle becomes lower than the prescribed threshold value at normal internal pressure.

2. An alarm device as claimed in claim 1, wherein the alarm section comprises a photocoupler (35) and a relay (36) connected to the output of the second latch circuit to generate and display an alarm at a remote place.

3. An alarm device as claimed in claim 1, wherein the signal processing section further comprises a switch (24) for cancelling the input of the pressure reduction sensed signal provided between the signal input terminal of the signal input section and the first AND gates and the OR gate of the signal processing section.

* * * * *